(12) United States Patent
Watkins

(10) Patent No.: US 10,118,108 B2
(45) Date of Patent: Nov. 6, 2018

(54) SYSTEM AND METHOD OF DISTILLATION PROCESS AND TURBINE ENGINE INTERCOOLER

(71) Applicant: General Electric Company, Schenectady, NY (US)

(72) Inventor: Richard Michael Watkins, Houston, TX (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 14/259,003

(22) Filed: Apr. 22, 2014

(65) Prior Publication Data
US 2015/0298024 A1 Oct. 22, 2015

(51) Int. Cl.
*B01D 1/00* (2006.01)
*B01D 3/00* (2006.01)
*C02F 1/16* (2006.01)
*F02C 6/10* (2006.01)
*F02C 6/18* (2006.01)
*F02C 7/143* (2006.01)
*F02C 7/18* (2006.01)
*B01D 3/14* (2006.01)
*C02F 103/08* (2006.01)

(52) U.S. Cl.
CPC ............ *B01D 3/146* (2013.01); *B01D 1/0058* (2013.01); *C02F 1/16* (2013.01); *F02C 6/10* (2013.01); *F02C 6/18* (2013.01); *F02C 7/143* (2013.01); *F02C 7/185* (2013.01); *C02F 2103/08* (2013.01); *F05D 2220/60* (2013.01); *F05D 2240/40* (2013.01); *F05D 2260/205* (2013.01); *F05D 2260/211* (2013.01); *Y02A 20/128* (2018.01)

(58) Field of Classification Search
CPC ....... C02F 1/04–1/18; C02F 1/16; F02C 6/04; F02C 6/08; B01D 1/26; B01D 3/007
See application file for complete search history.

(56) References Cited

U.S. PATENT DOCUMENTS 278,694 A 6/1883 Fallows
1,620,163 A 3/1927 Milliff et al.
(Continued)

FOREIGN PATENT DOCUMENTS

CA 2488434 6/2005
CN 102762501 A 10/2012
(Continued)

OTHER PUBLICATIONS

Machine Translation Okada et al. (JP 2006-70889 A) obtained via. Espacenet (Year: 2006).*
(Continued)

*Primary Examiner* — Bobby Ramdhanie
*Assistant Examiner* — Briana M Obenhuber
(74) *Attorney, Agent, or Firm* — Fletcher Yoder, P.C.

(57) ABSTRACT

A system includes an intercooler configured to flow a working fluid and compressed air of a gas turbine engine through the intercooler to exchange heat between the working fluid and the compressed air. The system also includes a multi-effect distillation system configured to flow the working fluid and a mixture to exchange heat between the working fluid and the mixture to enable distillation of the mixture.

20 Claims, 3 Drawing Sheets

(56) References Cited

U.S. PATENT DOCUMENTS

| | | | |
|---|---|---|---|
| 2,636,485 A | 4/1953 | Hillier | |
| 3,147,072 A | 9/1964 | Thomsen | |
| 3,289,402 A | 12/1966 | Jung et al. | |
| 3,376,204 A * | 4/1968 | Tidball | B01D 3/065 159/2.3 |
| 3,489,652 A | 1/1970 | Williamson | |
| 3,875,017 A * | 4/1975 | Saari | B01D 1/06 159/13.3 |
| 3,953,966 A | 5/1976 | Martz et al. | |
| 3,955,358 A | 5/1976 | Mart et al. | |
| 4,094,747 A | 6/1978 | Pfenninger | |
| 4,207,842 A | 6/1980 | Kehlhofer | |
| 4,238,296 A | 12/1980 | Sadhukhan | |
| 4,310,387 A | 1/1982 | Sadhukhan | |
| 4,330,373 A * | 5/1982 | Liu | C02F 1/14 159/17.1 |
| 4,751,814 A | 6/1988 | Farrell | |
| 4,896,499 A * | 1/1990 | Rice | F01D 5/185 60/39.182 |
| 5,386,685 A | 2/1995 | Frutschi | |
| 5,622,605 A | 4/1997 | Simpson et al. | |
| 5,678,401 A | 10/1997 | Kimura | |
| 5,884,470 A | 3/1999 | Frutschi | |
| 5,925,223 A * | 7/1999 | Simpson | B01D 3/065 159/17.1 |
| 5,952,223 A | 9/1999 | Kaplan et al. | |
| 6,223,523 B1 | 5/2001 | Frutschi | |
| 6,224,716 B1 * | 5/2001 | Yoder | B01D 3/06 159/2.1 |
| 6,833,056 B1 * | 12/2004 | Kamiya | B01D 1/0047 159/44 |
| 7,073,337 B2 * | 7/2006 | Mangin | B01D 3/007 60/783 |
| 7,197,876 B1 | 4/2007 | Kalina | |
| 7,269,956 B2 | 9/2007 | Gericke et al. | |
| 7,614,367 B1 * | 11/2009 | Frick | F22B 1/16 122/26 |
| 7,698,323 B1 | 4/2010 | Rangan et al. | |
| 7,799,178 B2 | 9/2010 | Eddington | |
| 8,328,995 B2 * | 12/2012 | Eddington | B01D 1/26 159/17.2 |
| 8,545,681 B2 | 10/2013 | Shapiro et al. | |
| 8,899,008 B2 | 12/2014 | Jones et al. | |
| 2003/0057165 A1 * | 3/2003 | Carson | B01D 3/007 210/774 |
| 2003/0121856 A1 | 7/2003 | Voutchkov | |
| 2004/0237539 A1 | 12/2004 | Mangin | |
| 2005/0121532 A1 | 6/2005 | Reale et al. | |
| 2005/0235625 A1 | 10/2005 | Gericke et al. | |
| 2006/0076428 A1 | 4/2006 | Knight et al. | |
| 2006/0157338 A1 | 7/2006 | Eddington | |
| 2006/0157410 A1 | 7/2006 | Hassan | |
| 2007/0006565 A1 | 1/2007 | Fleischer et al. | |
| 2007/0215453 A1 | 9/2007 | Eddington | |
| 2010/0326076 A1 | 12/2010 | Ast et al. | |
| 2011/0137892 A1 | 6/2011 | Bisson et al. | |
| 2011/0147195 A1 * | 6/2011 | Shapiro | C02F 1/441 203/10 |
| 2012/0048215 A1 | 3/2012 | Hicks et al. | |
| 2012/0159923 A1 | 6/2012 | Freund et al. | |
| 2012/0216502 A1 | 8/2012 | Freund et al. | |
| 2013/0263928 A1 | 10/2013 | Inoue et al. | |
| 2013/0270100 A1 | 10/2013 | Kwak et al. | |
| 2015/0298024 A1 | 10/2015 | Watkins | |
| 2016/0138798 A1 | 5/2016 | Assmann et al. | |
| 2016/0245125 A1 | 8/2016 | Watkins et al. | |
| 2017/0114672 A1 * | 4/2017 | Watkins | F01K 23/10 |

FOREIGN PATENT DOCUMENTS

| | | | |
|---|---|---|---|
| CN | 101384323 | 12/2013 | |
| DE | 849040 C | 9/1952 | |
| EP | 1921281 | 5/2008 | |
| EP | 2345799 A2 * | 7/2011 | F01K 23/04 |
| EP | 2410153 | 1/2012 | |
| EP | 2516334 A1 | 10/2012 | |
| EP | 2630342 | 9/2014 | |
| EP | 2937542 | 10/2015 | |
| JP | 59203812 A | 11/1984 | |
| JP | 2006070889 A * | 3/2006 | |
| WO | 2007095289 | 8/2007 | |
| WO | 2011014715 | 2/2011 | |
| WO | 2011078907 | 6/2011 | |
| WO | 2015000536 | 1/2015 | |

OTHER PUBLICATIONS

European Search Report and Opinion issued in connection with corresponding EP Application No. 15163369.0 dated Sep. 22, 2015.
U.S. Appl. No. 14/922,039, filed Oct. 23, 2015, Richard Michael Watkins.
Chinese Office Action for CN Application No. 201510191766.7 dated Jul. 10, 2017; 13 pgs.

* cited by examiner

SYSTEM AND METHOD OF DISTILLATION PROCESS AND TURBINE ENGINE INTERCOOLER

BACKGROUND

The subject matter disclosed herein relates to gas turbine engines and associated cooling systems.

Gas turbine engines include one or more turbine stages driven by hot gases of combustion. For example, a gas turbine engine may include a compressor section, a combustor section, and a turbine section. The compressor section may include one or more compressor stages configured to compress an oxidant (e.g., air), which is then routed to the combustor section. The combustor section may include one or more combustors configured to combust a fuel with the oxidant (e.g., air) to generate the hot gases of combustion. Finally, the turbine section may include one or more turbine stages driven by the hot gases of combustion. The gas turbine engine generates a considerable amount of heat, and thus one or more cooling systems may be used to cool sections of the gas turbine engine. Unfortunately, the cooling systems generally discharge any extracted heat into the atmosphere as waste heat.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an intercooler configured to flow a working fluid and compressed air of a gas turbine engine through the intercooler to exchange heat between the working fluid and the compressed air. The system also includes a multi-effect distillation system configured to flow the working fluid and a mixture to exchange heat between the working fluid and the mixture to enable distillation of the mixture.

In a second embodiment, a system includes a controller configured to regulate at least one valve to control a working fluid flow through an intercooler of a gas turbine engine and through a multi-effect distillation system.

In a third embodiment, a method includes flowing a working fluid through an intercooler of a gas turbine engine, exchanging heat between the working fluid and compressed air from the gas turbine engine, flowing the working fluid from the intercooler to a multi-effect distillation system, and exchanging heat between the working fluid and a mixture within a vessel of the multi-effect distillation system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
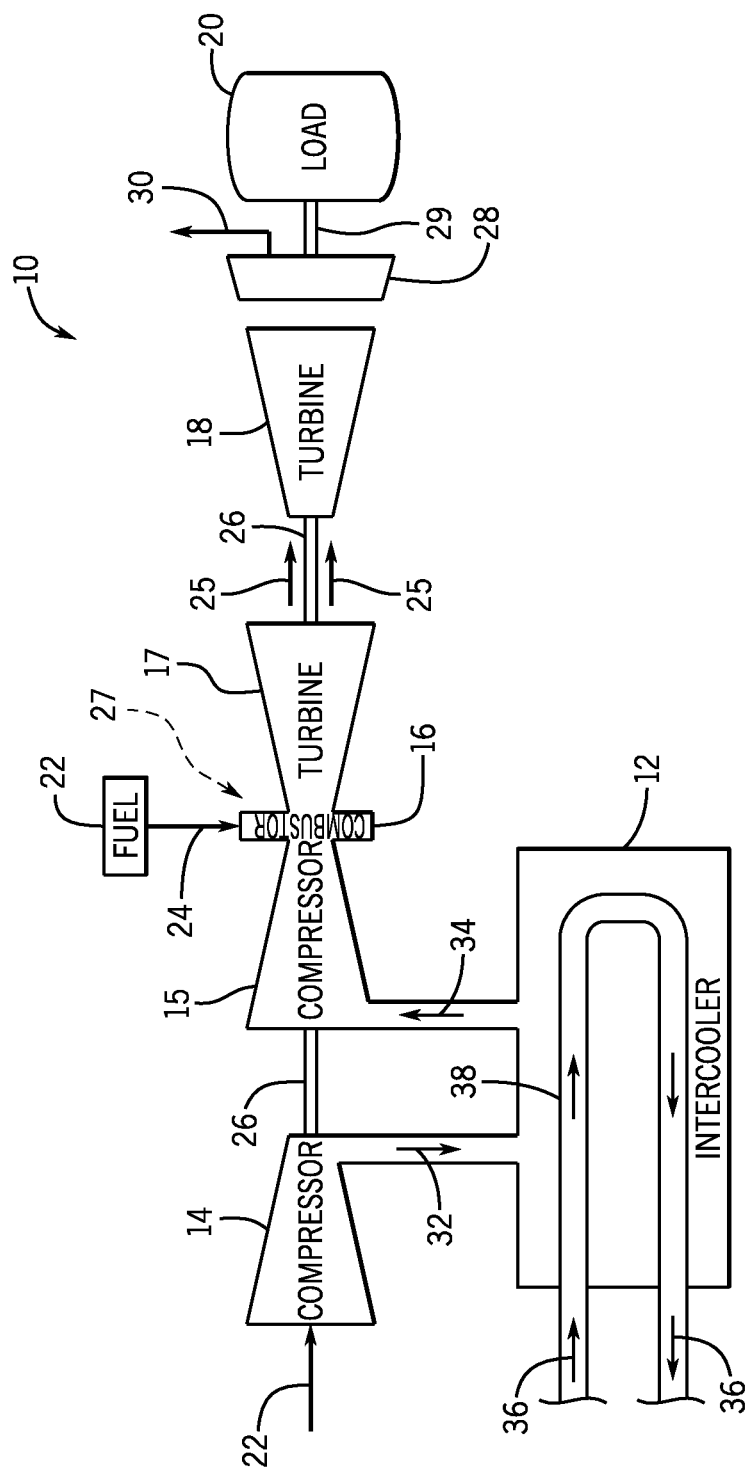
FIG. 1 is a schematic block diagram illustrating a turbine engine having an intercooler, in accordance with embodiments of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward engines, intercoolers of engines, and multi-effect distillation systems. Specifically, the present disclosure includes a turbine engine integrated with a multi-effect distillation system via an intercooler of the turbine engine, where a working fluid of the intercooler serves as a heat source for the multi-effect distillation system. Embodiments of the present disclosure are discussed in the context of a gas turbine engine and an intercooler thereof, although it should be noted that, in other embodiments in accordance with the present disclosure, a different type of engine with an accompanying intercooler may be integrated with the multi-effect distillation system. For example, the engine may be a reciprocating engine. The multi-effect distillation system integrated with the engine and intercooler includes a number of effects (e.g., boiling effects) that each occur within a vessel of the multi-effect distillation system.

Present embodiments of the disclosure include a turbine engine that includes a compressor configured to compress air for use in a combustor (e.g., a combustion chamber) of the turbine engine. The compressed air may be heated due to mechanical compression in the compressor. However, efficiency of the turbine engine is generally enhanced by cooling the compressed air to a temperature that may be controlled before delivery to subsequent stages of the compression process before ultimately being delivered to the combustor for combustion. Accordingly, an intercooler may be used as a heat exchanger for the compressed air. The compressed air may be routed into the intercooler, where a working fluid (e.g., water) is routed through coils or tubes in the intercooler and may extract heat from the compressed air. The cooled compressed air is delivered back to the compressor (e.g., subsequent stages of the compressor) at a temperature that may be controlled and further compressed and heated as it is delivered to the combustor of the turbine engine, and the heated working fluid may be routed from the intercooler to a multi-effect distillation system, where the working fluid is used as a heat source for a first-effect vessel of the multi-effect distillation system. Accordingly, heat extracted from the compressed air is recycled for use in the multi-effect distillation system instead of being rejected to a heat sink and otherwise wasted, i.e., waste heat.

Multi-effect distillation systems are generally used for separating a distillate from a concentrate, where the distillate and concentrate make up a mixture. For example, the mixture may be salt water, where the distillate is purified water and the concentrate is brine. Other examples of the mixture will be described below.

In one embodiment, the heated working fluid exiting the intercooler is passed to a first-effect vessel of the multi-effect distillation system that contains the mixture (e.g., a raw aqueous solution including the distillate and the concentrate). In the first-effect vessel, the working fluid exchanges heat with the mixture. The mixture is boiled to generate distillate steam (e.g., distillate vapor) that is exported to a second-effect vessel. Additionally, some of the mixture from the first-effect vessel is routed to the second-effect vessel, where the distillate vapor is used as a heat source for boiling the mixture in the second-effect vessel. The mixture in the second-effect vessel, however, has a higher concentration of concentrate than the mixture in the first-effect vessel because a portion of distillate steam (e.g., the distillate vapor) is boiled off the mixture in the first-effect vessel, as previously described. The term "effect," in relation to the multi-effect distillation system and each n-effect vessel (e.g., where n=first, second, third, etc.), refers to the boiling of the mixture in each n-effect vessel. The vessels may be coupled in series, such that each successive vessel utilizes heat generated by the effect (e.g., boiling) in the preceding vessel for the effect in the next successive vessel.

The process is repeated over any number of vessels until the mixture includes a sufficiently high concentration of concentrate, which is then exported from the system. Additionally, the distillate steam generated in each vessel loses heat to the mixture in a subsequent vessel, condenses, and is exported from the subsequent vessel as liquid distillate. Thus, the multi-effect distillation system generates two byproducts: liquid distillate and concentrate (or liquid distillate and a mixture with a high concentrate content). The liquid distillate produced from the multi-effect distillation system may be reused in the turbine engine instead of raw water resources, which may in turn reduce $NO_x$ or emissions of oxides of Nitrogen. Additionally, cost savings enabled by the recycling of heat in the working fluid may enable cost allocation in other areas of the system that may increase the quality of the system, as set forth throughout the present disclosure.

As will be appreciated, the multi-effect distillation system may include many different applications, depending on the embodiment. For example, the multi-effect distillation system may be a multi-effect desalinization system. In other words, the multi-effect distillation system may be used to generate fresh water distillate and a highly concentrated salt water (e.g., brine). Further, the multi-effect distillation may be used in applications involving raw water (e.g., well, lake, pond, or river water) purification, gray water purification, black water treatment, sugar juice concentration (e.g., to generate fresh water distillate and a highly concentrated sugar syrup), fruit juice concentration, black liquor concentration (e.g., in the paper industry), frack water concentration, produced brine water concentration, mine waste concentration, nuclear radiation waste concentration, or mixtures including one or more of petroleum, natural gas, petrochemicals, ethanol, or some other chemical. The present disclosure is intended to include any compatible multi-effect distillation system (e.g., with a mixture including any distillate and/or concentrate) of which the working fluid of the intercooler for the gas turbine engine can be used as a heat source, and the scope of the present disclosure should not be limited to a multi-effect distillation system of any particular mixture.

Turning now to the figures, FIG. 1 is a block diagram illustrating an embodiment of a turbine engine 10 with an intercooler 12. In the illustrated embodiment, the turbine engine 10 includes a compressor first stage 14 and compressor second stage 15, a combustor 16 (e.g. combustion chamber 16), a turbine first stage 17 and a turbine second stage 18, and a load 20 (e.g., driven device), among other components set forth below. The combustor 16 includes a fuel nozzle 22 which routes fuel 24 (e.g., gaseous or liquid fuel), such as natural gas, syngas, or petroleum distillates, into the combustor 16. In certain embodiments, the gas turbine engine 10 may include multiple combustors 16, each with one or more fuel nozzles 22.

In the illustrated embodiment, the combustor 16 ignites and combusts an air-fuel mixture (e.g., the air 22 from the compressors 14, 15, and the fuel 24 from the fuel nozzle 22), and passes hot pressurized combustion gases 25 (e.g., combustion products) to the turbines stages 17, 18. The turbine second stage 18 is coupled to a first shaft 26 and the turbine first stage 17 is coupled to a second shaft 27, where the second shaft 27 is hidden in the illustrated embodiment by the combustor 16. The first shaft 26 is also coupled to the compressor first stage 14, and the second shaft 27 is also coupled to the compressor second stage 15. As the combustion gases 25 (e.g., combustion products) pass through the turbine blades in the turbine first and second stages 17, 18, the turbine stages 17, 18 are driven into rotation, which causes the shafts 27, 26, respectively, to rotate, where the shafts 27, 26 are, as described above, coupled to the compressors 15, 14. Thus, the turbine blades extract work from the combustion gases 25, such that the turbine stages 17, 18 drive the compressor stages 15, 14, respectively, via the shafts 27, 26, respectively.

Further, the combustion gases 25 exit the turbine second stage 18 as exhaust gas and enter into a third turbine 28, driving turbine blades of the third turbine 28. The third turbine 28 is coupled to the load 20 via a third shaft 29. Accordingly, the third turbine 28 extracts work from the exhaust gas to drive the load 20, and the exhaust gas exits the engine 10 via an exhaust gas outlet 30. The load 20 (e.g., driven device) may be any suitable device that may generate power via the rotational output of the turbine engine 10, such as a power generation plant or an external mechanical load. In one embodiment, the load 20 may include an electrical generator, a compressor of a process gas, and so forth.

In an embodiment of the turbine engine 10, compressor blades are included as components of the compressors 14, 15. The blades within the compressors 14, 15 are coupled to the shafts 27, 26, such that the compressor blades will rotate as the shafts 27, 26 are driven to rotate by the turbines 17, 18, as described above. The rotation of the blades within the compressors 14, 15 causes compression of the air 22 entering the compressors 14, 15, thereby generating compressed air 32. Due to mechanical compression of the air 22 in the compressors 14, 15, the compressed air 32 is generally elevated in temperature (e.g., relatively hot). For example, compressed air 32 exiting the compressor first stage 14 is generally heated due to mechanical compression in the compressor first stage 14. However, efficiency of the turbine engine 10 is enhanced by delivering cooled compressed air 34 to be further compressed in subsequent compressor stages (e.g., the compressor second stage 15), where the cooled compressed air 34 delivered to the compressor second stage 15 will be compressed and heated again before delivery to the combustor 16. Thus, the compressed air 32 may be routed into the intercooler 12 of the turbine engine 10 from the compressor first stage 14, where a working fluid 36 is routed through the intercooler 12. In the illustrated embodiment, the working fluid 36 is cool and is routed through a coil 38 in the intercooler 12. The working fluid 36 extracts heat from the compressed air 32 to generate cooled compressed air 34 and to heat the working fluid 36. The cooled compressed air 34 is then delivered to the compressor second stage 15 at a controlled temperature (as set forth below with reference to later figures) for additional compression and heating before being sent to the combustor 16, and the working fluid 36 (e.g., heated working fluid) exits the intercooler 12 at a higher temperature than the working fluid 36 was when it entered the intercooler 12. In existing designs, the working fluid 36 generally deposits heat in a heat sink, such that the working fluid 36 can be delivered back to the intercooler 12 at a desired (e.g., lower) temperature. However, it would be advantageous to recycle heat extracted by the working fluid 36 from the compressed air 32 by routing the working fluid 36 to some other system or component external to the turbine engine 10, where the heat may be utilized to perform some other role or function. For example, the working fluid 36 (e.g., heated working fluid) in the illustrated embodiment, in accordance with the present disclosure, may be routed to a multi-effect distillation system, where the working fluid 36 may be used as a heat source for powering the multi-effect distillation system.

Figure 2:
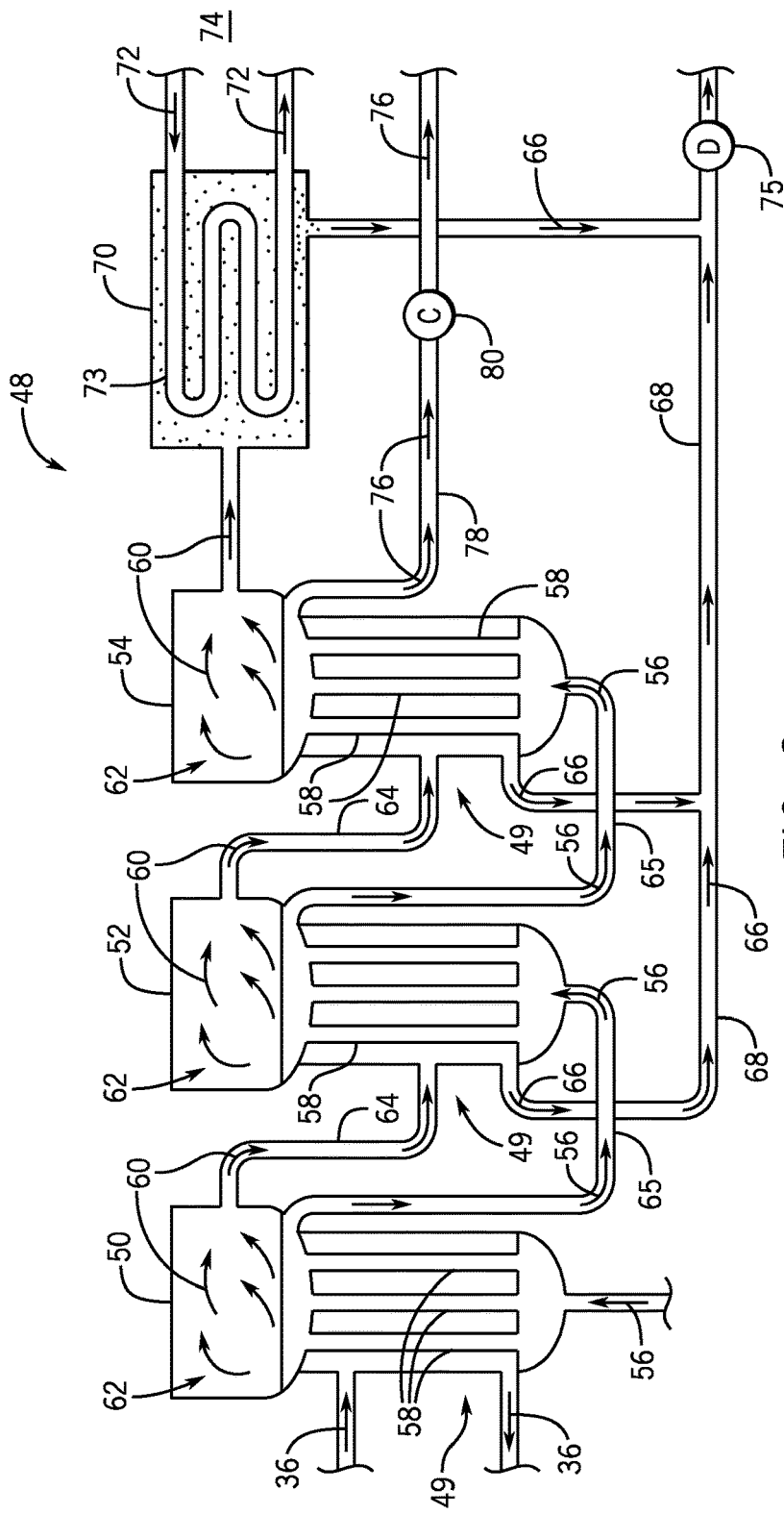
FIG. 2 is a schematic block diagram illustrating a multi-effect distillation system utilizing a working fluid, in accordance with embodiments of the present disclosure.

With the foregoing in mind, FIG. 2 is a block diagram illustrating another aspect of the present disclosure, e.g., an embodiment of a multi-effect distillation system 48. In the illustrated embodiment, the multi-effect distillation system 48 includes a first-effect vessel 50, a second-effect vessel 52 (e.g., intermediate-effect vessel), and a last-effect vessel 54. However, any number of vessels may be used in the multi-effect distillation system 48. For example, the multi-effect distillation system 48 may include 2, 3, 4, 5, 6, 7, 8, 9, 10, 11, 12, 13, 14, 15, 16, or more vessels for as many effects (e.g., one effect per vessel) as desired. Additionally, if one intermediate-effect vessel is considered more important than another (e.g., if one is found to be more efficient than another), lubricating oil cooling, jacket water cooling, or other engine waste heat producers can be introduced into the multi-effect distillation process 48 at the appropriate vessel where temperature of that waste heat producer is most beneficial to the distillation process.

In the illustrated embodiment, a working fluid (e.g., the working fluid 36) may enter into a heat exchange portion 49 of the first-effect vessel 50. Also routed through the heat exchange portion 49 of the first-effect vessel 50 is a mixture 56 containing a component to be distilled and a component to be concentrated. In accordance with the present disclosure, the distillate may be fresh water or some other liquid distillate. Additionally, the concentrate may be salt, sugar, black liquor, fruit juice, or any other compound or element that could benefit from the multi-effect distillation system 48 of the present disclosure.

In the illustrated embodiment, the mixture 56 is routed through tubes 58 in the heat exchange portion 49. The mixture 56 extracts heat from the working fluid 36, which is external to the tubes 58 but in the heat exchange portion 49, such that the mixture 56 is boiled. In some embodiments, the working fluid 36 may be routed through the tubes 58 and the mixture 56 may be external to the tubes 58, but within the heat exchange portion 49.

Further, the heat exchange portion 49 may include some other type of heat exchange surface. For example, the heat exchange portion 49 may include plate type heat exchangers that utilize plates as opposed to tube type heat exchangers that utilize the tubes 58. For example, the heat exchange portion 49 may include a compartment configured to receive the mixture 56 and a compartment configured to receive the working fluid 36, where the compartments are separated by a metal plate. The metal plate disposed between the compartments is thermally conductive, such that the metal plate conducts heat from the working fluid 36 and transfers the heat to the mixture 56. In another embodiment, multiple metal plates may be included to separate multiple compartments, where one or more compartments receive the mixture 56 and one or more compartments receive the working fluid 36, and each metal plate is configured to transfer heat from the working fluid 36 to the mixture 56. Further still, the heat exchange portion 49 may include membrane type heat exchangers that utilize tanks that include one or more membranes and/or one or more cooling foils. For example, the mixture 56 may be heated in a first tank, such that vapor distillate passes through the membrane of the tank and contacts a cooling foil of the next tank, which extracts heat from the vapor distillate and condenses the vapor distillate into liquid distillate. Additionally, the foil may be heated by the distillate steam 60, such that the mixture 56 within the tank having the foil is heated, and the process is continued.

In the above described configuration (e.g., including heat exchange portions 49 with either tubes 58 or plates), a portion of the mixture 56 (e.g., distillate) may be boiled and evaporated from the mixture 56 to generate distillate steam 60 (e.g., distillate vapor) in a bulb enclosure 62 of the first-effect vessel 50 above the heat exchange portion 49. The working fluid 36 may lose heat and exit the heat exchange portion 49 of the first-effect vessel 50, such that the working fluid 36 may be exported from the first-effect vessel 50 for use elsewhere, as will be described in detail later with reference to FIG. 3.

In the bulb enclosure 62 of the first-effect vessel 50 (e.g., first-boiling vessel), the distillate steam 60 is routed via a steam passageway 64 to the second-effect vessel 52 (e.g., second-boiling vessel), or intermediate-effect vessel (e.g., intermediate-boiling vessel). The distillate steam 60 enters the heat exchange portion 49 of the second-effect vessel 52 from the steam passageway 64. Additionally, a portion of the mixture 56 is routed from the first-effect vessel 50 to the second-effect vessel 52 via a mixture passageway 65, where the mixture 56 is routed through tubes 58 in the heat exchange portion 49 of the second-effect vessel 52. The mixture 56 in the tubes 58 of the second-effect vessel 52 extracts heat from the distillate steam 60 in the heat exchange portion 49, such that the mixture 56 in the second-effect vessel 52 boils and generates distillate steam 60 in the bulb enclosure 62 above the heat exchange portion 49 of the second-effect vessel 52. Additionally, the distillate steam 60 in the heat exchange portion 49 of the second-effect vessel 52, used as the heat source in the second-effect vessel 52, loses heat to the mixture 56 in the tubes 58, condenses into liquid distillate 66, and is exported to the liquid distillate line 68, which may export the liquid distillate 66 elsewhere as a product of the multi-effect distillation system 48.

In the illustrated embodiment, the first-effect vessel 50 includes a first-effect, the last-effect vessel 54 includes a last-effect which will be described in detail below, and the second-effect vessel 52 (e.g., intermediate-effect vessel) includes an intermediate-effect (e.g., the only intermediate-effect). In another embodiment, a number of different vessels may be used to include a number of different intermediate-effects (e.g., one vessel per intermediate-effect). For example, the second-effect vessel 52, a third-effect vessel, a fourth-effect vessel, a fifth-effect vessel, and a sixth-effect vessel may each include an intermediate-effect and may each be referred to as an intermediate-effect vessel. In another embodiment, the multi-effect distillation system may only include a first-effect and last-effect. As previously described, the multi-effect distillation system may include 2, 3, 4, 5, 6, 7, 8, 9, 10, 11, 12, 13, 14, 15, 16, or more effects.

Continuing with the illustrated embodiment, the second-effect vessel 62 is the only intermediate-effect vessel in the illustrated multi-effect distillation system 48. The distillate steam 60 in the bulb enclosure 62 of the second-effect vessel 52 is routed via the steam passageway 64 into the heat exchange portion 49 of the last-effect vessel 54. Additionally, the distillate steam 60 routed through the heat exchange portion 49 of the second-effect vessel 52 loses heat to the mixture 56 in the tubes 58 of the heat exchange portion 49, condenses into liquid distillate 66, and is exported to the liquid distillate line 68.

The distillate steam 60 generated in the bulb enclosure 62 of the second-effect vessel 52 and routed via the steam passageway 64 enters into the heat exchange portion 49 of the last-effect vessel 54, where distillate steam 60 is used as a heat source for heating the mixture 56. The mixture 56 is exported from the second-effect vessel 52 to the last-effect vessel 54 via the mixture passageway 65, where it enters the heat exchange portion 49. As previously described, the mixture 56 is routed through the tubes 58 and extracts heat from the distillate steam 60, such that the mixture 56 is boiled and generates distillate steam 60 in the bulb enclosure 62 of the last-effect vessel 54.

In the illustrated embodiment, the distillate steam 60 generated in the bulb enclosure 62 of the last-effect vessel 54 is exported to a condenser 70. In some embodiments, the condenser 70 may include an air-ejector for maintaining vacuum in the condenser 70 while urging the distillate steam 60 into the condenser 70. The mechanism by which the air injector works will be discussed in further detail with reference to FIG. 3. In the illustrated embodiment, a condensing fluid 72 is routed through coils 73 (e.g., tubes) in the condenser 70. The condensing fluid 72 may be the same fluid as the mixture 56 (e.g., originating from a mixture source 74), or it may be some other fluid, and the condensing fluid 72 may extract heat from the distillate steam 60 in the condenser 70. Thus, the distillate steam 60 may condense into liquid distillate 66. The liquid distillate 66, in the illustrated embodiment, is exported to the liquid distillate line 68, where the liquid distillate 66 is pumped through the liquid distillate line 68 via a liquid distillate pump 75. The condensing fluid 72, which extracts heat from the distillate steam 60 in the condenser 70, exits the condenser 70 at a higher temperature than it entered with. The heated condensing fluid 72 (e.g., the heated mixture 56) may be exported back to the mixture source 74 (e.g., the mixture source 74 in a power plant (e.g., water tower), or some other mixture source 74), for use in another portion of the multi-effect distillation system 48, or a combination of both. In other words, a portion of the heated condensing fluid 72 may be exported to the sea (e.g., where it initially came from) and a second portion of the heated condensing fluid 72 may be exported to another part of the multi-effect distillation system 48 (e.g., as a portion of the mixture 56 entering the heat exchange portion 49 of the first-effect vessel 50).

As described above, the multi-effect distillation system 48 produces liquid distillate 66. Additionally, a portion of the mixture 56 (e.g., concentrate 76) may be exported from the last-effect vessel 54 as another product of the multi-effect distillation system 48. The mixture 56 may include a high ratio of concentrate 76 to distillate 66. This may be enabled by the fact that, as the mixture 56 is distributed from the first-effect vessel 50 to the second-effect vessel 52 and from the second-effect vessel 52 to the last-effect vessel 54, concentrate 76 content in the mixture 56 increases relative to liquid distillate 66 content from vessel to vessel. In other words, because each vessel generates distillate steam 60 from the mixture 56 (e.g., distillate steam 60 substantially void of concentrate 76), the liquid distillate 66 content in the mixture 56 (e.g., relative to concentrate 76 content) decreases. Accordingly, the last-effect vessel 54 includes the highest concentration of concentrate 76 in the mixture 56, as compared to any previous vessel in the multi-effect distillation system 48. The highly concentrated mixture 56, or, in some embodiments, substantially pure concentrate 76, is exported to a concentrate line 78 and pumped through the concentrate line 78 via a concentrate pump 80. The concentrate pump 80 and the liquid distillate pump 75 export the concentrate 76 and the liquid distillate 66, respectively, from the multi-effect distillation system 48. In certain embodiments, the concentrate pump 80 and concentrate line 78 may actually refer to a pump and line used to transport a highly concentrated portion of the mixture 56 (e.g., containing a high concentration of the concentrate 76) from the last-effect vessel 54, as previously described, and that the terms "concentrate pump" and "concentrate line" are used to differentiate the line from the liquid distillate pump 75 and liquid distillate line 68, respectively, which may be used to transport pure liquid distillate 66.

Figure 3:
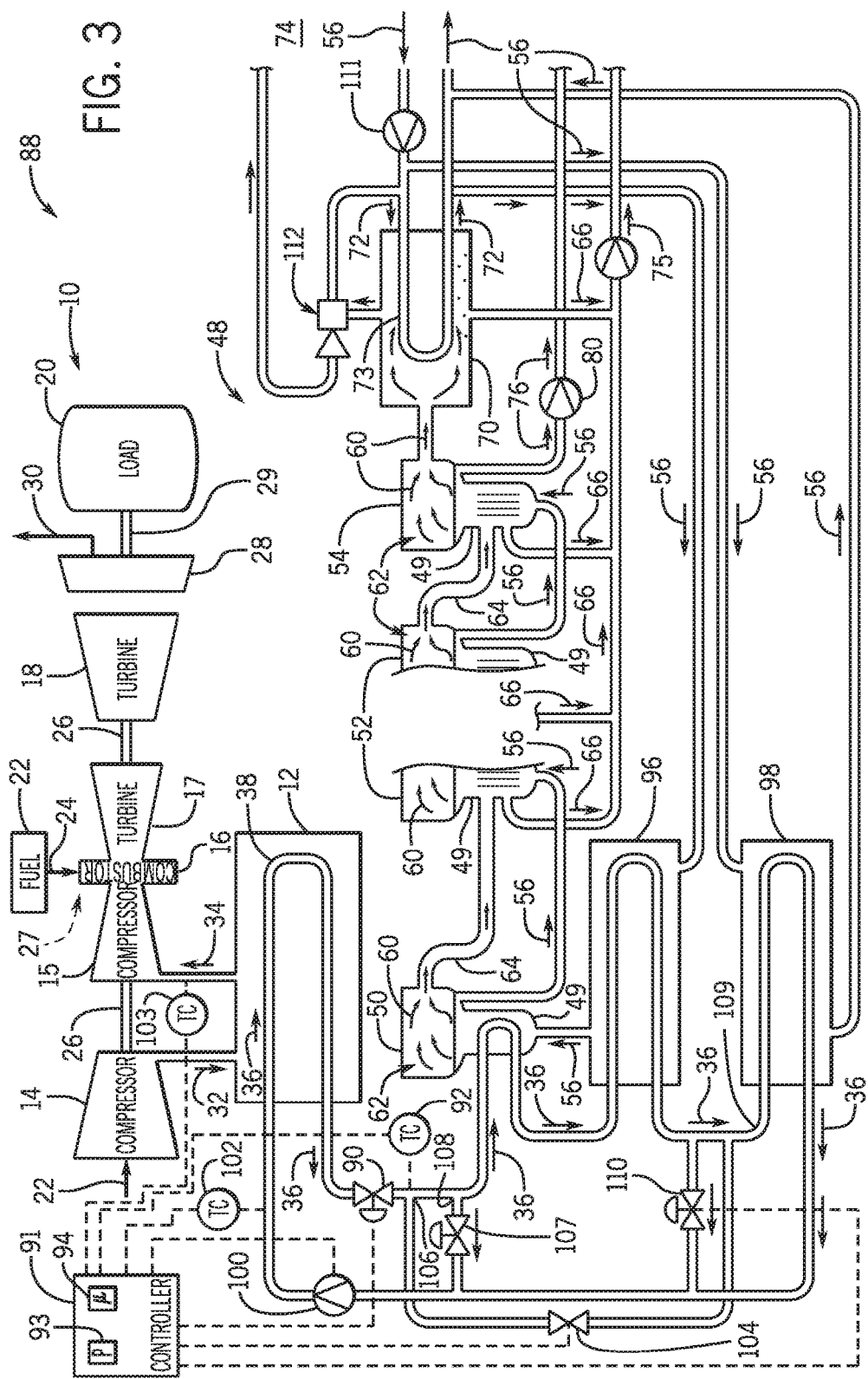
FIG. 3 is a schematic block diagram illustrating a turbine engine having an intercooler with a multi-effect distillation system, in accordance with embodiments of the present disclosure.

Turning now to FIG. 3, an embodiment of an integrated system 88 including the gas turbine system 10 having the intercooler 12 integrated with the multi-effect distillation system 48, in accordance with the present disclosure, is shown. In the illustrated embodiment, the gas turbine system 10 may function similar to, or the same as, the embodiment of the gas turbine system 10 described with reference to FIG. 1. Additionally, the multi-effect distillation system 48 may function similar, or the same as, to the embodiment of the multi-effect distillation system 48 described with reference to FIG. 2.

In the illustrated embodiment, the working fluid 36 is used as a heat source for the first-effect vessel 50 of the multi-effect distillation system 48. For example, the working fluid 36 may exit the intercooler 12 after extracting heat from the compressed air 32 and enter into the heat exchange portion 49 of the first-effect vessel 50. In certain embodiments, a flow of the working fluid 36 through the intercooler 12 may be controlled by a control valve 90 disposed downstream of the intercooler 12. The control valve 90 may increase or decrease a flow rate of the working fluid 36 by widening or narrowing a flow path through the control valve 90, in order to control a temperature of the working fluid 36 exiting the intercooler 12. In other words, controlling the flow rate of the working fluid 36 in turn controls the temperature of the working fluid 36 entering the multi-effect distillation system 48.

The control valve 90 may be coupled to a controller 91, and a temperature sensor 92 that measures the temperature of the working fluid 36 downstream of the intercooler 12 may also be coupled to the controller 91. The controller 91 may include a processor 93 and a memory 94. The processor 93 may execute instructions and/or operate on data stored in the memory 94. The temperature sensor 92 may read a temperature of the working fluid 36 and provide a measurement of the temperature to the controller 91 which, based on the measurement from the temperature sensor 92, may execute the instructions stored in the memory 94 to narrow or widen the control valve 90, which decreases or increases, respectively, the flow rate of the working fluid 36. By decreasing or increasing the flow rate of the working fluid 36, the temperature of the working fluid 36 may be controlled by the controller 91. Accordingly, the control valve 90 may be narrowed or widened such that a desired temperature of the working fluid 36 downstream of the intercooler 12 is maintained by the controller 91. In certain embodiments, the control valve 90 may be disposed upstream of the intercooler 12 and function in a similar manner (e.g., to control a flow rate of the working fluid 36 upstream of the intercooler 12, which in turn affects the temperature of the working fluid 36). Additionally, in certain embodiments, the temperature sensor 92 may be disposed upstream of the intercooler 12, to provide feedback to the controller 91 including temperature measurements upstream of the intercooler 12.

In each of the above referenced embodiments, the working fluid 36 enters the heat exchange portion 49 of the first-effect vessel 50 at a desired temperature to boil the mixture 56 entering the first-effect vessel 50, as previously described. In certain embodiments (e.g., in embodiments of the multi-effect distillation system 48 used as a multi-effect desalinization system to distill fresh water from salt water), the working fluid 36 may enter into the heat exchange portion 49 of the first-effect vessel 50 at a temperature within a range of, e.g., approximately 180° F. to 220° F. (82° C. to 105° C.), approximately 190° F. to 215° F. (88° C. to 101° C.), approximately 200° F. to 210° F. (93° C. to 99° C.), or approximately 204° F. to 207° F. (96° C. to 97° C.). Because the working fluid 36 is recycled from the intercooler 12 as the heat source in the multi-effect distillation system 48, the multi-effect distillation system 48 may operate without regard to ambient temperature, which may not be the case if some other heating agent from the environment is used.

While the working fluid 36 may be controlled via the control valve 90 and the controller 91 to provide a desired temperature of the working fluid 36, the mixture 56 entering the first-effect vessel 50 may be controlled to provide a desired temperature of the mixture 56 as well. For example, in the illustrated embodiment, the mixture 56 entering the first-effect vessel 50 may come from the source 74. Before reaching the first-effect vessel 50, the mixture 56 may be routed through various other portions of the multi-effect distillation system 48 downstream of the first-effect vessel 50. For example, in the illustrated embodiment, a portion of the mixture 56 from the source 74 is routed through the condenser 70 of the multi-effect distillation system 48 to exchange heat with the distillate steam 60 exported from the last-effect vessel 54, as described above with reference to FIG. 2. The mixture 56 is heated to an extent by the condensation of the distillate steam 60 and exported from the condenser 70.

A portion of the mixture 56 exiting the condenser 70 may be returned to the source 74, and another portion of the mixture 56 may be routed to a feed heater 96 (or multiple feed heaters) used as a heat exchanger for the working fluid 36. Thus, by routing a portion of the mixture 56 from the condenser 70 to the feed heater 96, heat extracted by the working fluid 36 in the condenser 70 is recycled, as set forth below. The working fluid 36 exiting the heat exchange portion 49 of the first-effect vessel 50 pre-heats the mixture 56 in the feed heater 96 to a desired temperature, such that the mixture 56 is introduced into the heat exchange portion 49 of the first-effect vessel 50 at a desired temperature. In some embodiments, the mixture 56 may enter into the heat exchange portion 49 of the first-effect vessel 50 at a temperature within a range, e.g., of approximately 180° F. to 220° F. (82° C. to 105° C.), approximately 190° F. to 210° F. (88° C. to 99° C.), or approximately 195° F. to 205° F. (91° C. to 96° C.). The temperature of the mixture 56 entering the heat exchange portion 49 of the first-effect vessel 50 may be nearly identical to, but slightly below, the temperature of the working fluid 36 entering the heat exchange portion 49 of the first-effect vessel 50, which may produce an improved heat exchange effect.

After losing heat to the mixture 56 in the feed heater 96, the working fluid 36 is routed from the feed heater 96 to a cooler 98. The cooler 98 may be configured to further cool the working fluid 36 by using a portion of the mixture 56 directly from the source 74 to cool the working fluid 36. In other words, a portion of the mixture 56 may be routed directly from the source 74, as shown in the illustrated embodiment, to the cooler 98, where the mixture 56 extracts heat from the working fluid 36. The mixture 56 is then routed from the cooler 98 back to the source 74, and the working fluid 36 exits the cooler 98 at the lowest possible temperature for delivery back to the intercooler 12 of the gas turbine system 10. In certain embodiments, the working fluid 36 may exit the cooler 98 at a first temperature, such that the working fluid 36 can be pumped into the intercooler 12 at a desired second temperature by a working fluid pump 100, where the desired second temperature may be the temperature that is required to control the desired temperature of the cooled compressed air returning to the engine 34. The working fluid pump 100 may be controlled via the controller 91 in the same manner as the control valve 90 described above. The controller 91 may accept feedback (e.g., temperature measurements) from a temperature sensor 102 in a similar manner as the controller 91 accepts temperature measurements from temperature sensor 92 associated with the control valve 90, as described above. Thus, the controller 91 may control the working fluid pump 100 to decrease or increase a flow rate of the working fluid 36 in order to maintain a desired temperature of the working fluid 36 for enhanced heat exchange with the compressed air 32 in the intercooler 12. Further, in some embodiments, the controller 91 may accept feedback (e.g., temperature measurements) from a temperature sensor 103 disposed between the intercooler 12 and one of the compressors 14, 15 that measures a temperature of the compressed air (e.g., compressed air 32 or 34), in this case the cooled compressed air 34. The controller 91 may then determine an appropriate response and regulate the working fluid pump 100, or some other control valve (e.g., control valve 90) included in FIG. 3, such that the cooled compressed air 34 is delivered to the subsequent stage of the compressor 15 at the appropriate temperature for further compression and heating before delivery to the combustor 16.

In the illustrated embodiment, the working fluid 36 may be routed from a main path of the working fluid 36 for various reasons. For example, the working fluid 36 may be routed to a different path than described above to isolate the gas turbine engine 10 from the multi-effect distillation system 48. Further, a portion or all of the working fluid 36 may be routed from one stage of the main path to another stage of the main path to control a temperature of the working fluid 36 in a certain portion of the main path.

For example, a bypass valve 104 may be included to assist in isolating the gas turbine engine 10 from the multi-effect distillation system 48. The bypass valve 104 may be controlled by the controller 91. The controller 91 may generally instruct the bypass valve 104 be remain closed during operation of the integrated system 88 of the present disclosure, but the controller 91 may instruct the bypass valve 104 to open to isolate the gas turbine engine 10 from a portion of the multi-effect distillation system 48 such that maintenance can be performed on one or the other. When the bypass valve 104 is opened, the working fluid 36 may be channeled entirely through the bypass valve 104 from junction 106, such that the working fluid 36 bypasses the first-effect vessel 50 and the feed heater 96. The working fluid 36 may be routed back onto the main path of the working fluid 36 at junction 108, where the working fluid 36 is routed into the cooler 98, which acts as a heat sink for the working fluid 36, such that the working fluid 36 is delivered back to the intercooler 12 at the appropriate temperature for heat exchange with the compressed air 32. The control valve 90 and the working fluid pump 100, of course, may still be utilized and controlled by the controller 91 to assist in controlling the flow rate of the working fluid 36, which in turn may control the temperature of the working fluid 36, such that the working fluid 36 is delivered to the intercooler 12 at the appropriate temperature, as previously described.

Additionally, the gas turbine engine 10 may be isolated from the multi-effect distillation system 48 via a warm up valve 107 when the gas turbine engine 10 is first powered for operation, such that the working fluid 36 (and in some embodiments, the gas turbine engine 10) is "warmed up," as it may take a period of time (e.g., 10 to 15 minutes) before the working fluid 36 reaches appropriate temperatures and/or the gas turbine engine 10 is working at full capacity and appropriate temperatures. The "warm up" interval (e.g., 10 to 15 minutes) of the gas turbine engine 10 may be as fast as the engine limits permit. Thus, the warm up valve 107 may enable the engine to start and ramp to full power as fast as the engine limits permit, which may not be the case if the warm up valve 107 is not included and the working fluid 36 is routed through the entire main path of the working fluid 36. In other words, when opened via instructions from the controller 91, the warm up valve 107 may shorten the path of the working fluid 36, such that the working fluid 36 does not lose heat along a longer path. The warm up valve 107 may be opened, such that the working fluid 36 in its entirety is routed from junction 109 through the warm up valve 107 and back to the intercooler 12. In some embodiments, the warm up valve 107 may be configured to route a portion of the working fluid 36 from junction 109 back to the intercooler 12 (e.g., based on instructions from the controller 91, executed upon receiving temperature measurements from one or more temperatures sensors (e.g., temperature sensor(s) 92 and/or 102)), while a portion of the working fluid 36 is still delivered to the first-effect vessel 50 of the multi-effect distillation system 48. This may enable enhanced temperature control of the working fluid 36 entering theintercooler 12, as well as enhanced temperature control of the working fluid 36 entering the heat exchange portion 49 of the first-effect vessel 50.

Further, a blend valve 110 may also be included and instructed by the controller 91 to assist in controlling temperature of the working fluid 36. For example, the blend valve 110 in the illustrated embodiment is located between the feed heater 96 and the cooler 98. The blend valve 110 may be opened (e.g., via instructions from the controller 91, executed upon receiving temperature measurements from one or more temperature sensors (e.g., temperature sensor(s) 92 and/or 102) to route a portion of the working fluid 36 exiting the feed heater 96 past the cooler 98 and back to the main path of the working fluid 36. The blend valve 110 may be opened if the working fluid 36 entering the intercooler 12 is too cold, because a portion of the working fluid 36 would bypass the cooler 98, such that the cooler 98 does not extract heat from that portion of the working fluid 36. In some embodiments, the portion of the working fluid 36 flowing through the blend valve 110 may be the entirety of the working fluid 36, such that the cooler 98 is not utilized during certain times of operation. Additionally, the blend valve 110 may include a varying amount of restrictiveness. In other words, at a first time of operation, the blend valve 110 may receive instructions from the controller 91 based on a first reading from the temperature sensor 102, such that the blend valve 110 opens to a first extent to provide working fluid 36 to the intercooler 12 at a desired temperature. At a second time of operation, the blend valve 110 may receive instructions from the controller 91 based on a second reading from the temperature sensor 102, such that the blend valve 110 opens to a second extent to provide working fluid 36 to the intercooler 12 at the desired temperature.

Focusing on the multi-effect distillation system 48 portion of the integrated system 88, the vessels (e.g., the first effect vessel 50, the intermediate effect vessel(s) 52, and the last-effect vessel 54) may operate in the same way as that of the embodiment of the multi-effect distillation system 48 described with reference to FIG. 2. Once the distillate steam 60 exits the last-effect vessel 54 and enters into the condenser 70, the distillate steam 60 may be cooled and condensed via the mixture 56 that is pumped to the coils 73 via the mixture pump 111. In order to urge the distillate steam 60 toward the coils 73 of the condenser 70, an air ejector 112 may be attached to the condenser 70 to maintain vacuum within the condenser 70. The air ejector 112 may displace air or other non-condensable fluid within the condenser 70 as the distillate steam 60 enters the condenser 70, such that the distillate steam 60 is urged toward the coils 73 of the condenser 70 where the act of condensation of the distillate steam 60 creates the vacuum.

In summation, embodiments of the present disclosure are directed toward the integrated gas turbine engine 10, intercooler 12, and multi-effect distillation system 48. The working fluid 36 of the intercooler 12 is configured to extract heat from the compressed air 32 of the gas turbine engine 10 and provide heat (e.g., lose heat) to the mixture 56 in the first-effect vessel 50, such that the mixture 56 boils and a portion of the mixture 56 is boiled to generate the distillate steam 60. Further, in certain embodiments, various valves (e.g., the control valve 90, the blend valve 110, the warm up valve 107, and the bypass valve 104) are included and configured to work in conjunction with various temperature sensors (e.g., temperature sensor 92 and temperature sensor 102) to affect temperature of the working fluid 36 in various portions of the main path of the working fluid 36. The valves and their associated temperature sensors (e.g., control elements) may generally enable manipulation of flow rate and temperature of the working fluid 36 at any point in the cycle (e.g., path) of the working fluid 36. Thus, temperature of the working fluid 36 may be determined via the control elements at an inlet and/or outlet of the intercooler 12, the first-effect vessel 50, the feed heater 96, the cooler 98, or any other point in the path of the working fluid 36. Further, the control elements enable operation of the integrated gas turbine engine 10 and multi-effect distillation system 48 in varying ambient conditions, because flow rates of the working fluid 36 may be manipulated to via the control elements to manipulate temperature, as set forth above. Further, additional heat exchangers (e.g., the feed heater 96 and the cooler 98) are included to affect temperature of the working fluid 36 and, in some embodiments, the mixture 56 entering the first-effect vessel 50 of the multi-effect distillation system 48. Further, due to cost savings of recycling heat of the working fluid 36, cost may be allocated in other areas for improved operation of the gas turbine engine 10 and/or the multi-effect distillation system 48. For example, cost may be allocated for utilizing water injection into the gas turbine engine 10 for $NO_x$ control, rather than having to use a dry emissions control type of engine or produce said injection water by other means.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an intercooler configured to flow a working fluid and compressed air of a compressor section of a gas turbine engine through the intercooler to exchange heat between the working fluid and the compressed air;
a multi-effect distillation system having a first effect vessel configured to flow the working fluid and a mixture to exchange heat between the working fluid and the mixture to enable distillation of the mixture, wherein the working fluid comprises a maximum temperature of at most 220 degrees Fahrenheit and a minimum temperature of at least 180 degrees Fahrenheit as the working fluid enters the first effect vessel; and
a closed loop configured to flow the working fluid between the intercooler and the multi-effect distillation system within the closed loop.

2. The system of claim 1, wherein the multi-effect distillation system comprises a plurality of effect vessels configured to distill the mixture, wherein the plurality of effect vessels comprises the first effect vessel, and wherein the first effect vessel of the plurality of effect vessels is configured to exchange heat only between the working fluid received from the intercooler and the mixture to produce a first distillate steam and a first concentrated mixture.

3. The system of claim 2, wherein the plurality of effect vessels comprises a second effect vessel downstream of the first effect vessel with respect to a flow of the first concentrated mixture, wherein the second effect vessel is configured to exchange heat between the first distillate steam and the first concentrated mixture to produce a second distillate steam and a second concentrated mixture.

4. The system of claim 1, comprising a controller configured to regulate operation of one or more valves to control flow of the working fluid through the intercooler and/or the multi-effect distillation system.

5. The system of claim 4, wherein the one or more valves comprise a flow control valve disposed downstream of the intercooler and upstream of the multi-effect distillation system.

6. The system of claim 5, comprising at least one temperature sensor, wherein the at least one temperature sensor is configured to measure a temperature of the working fluid, a temperature of the compressed air, or both, wherein the controller is configured to regulate operation of the one or more valves based on feedback received from the at least one temperature sensor.

7. The system of claim 5, wherein the one or more valves comprise a warm up valve configured to divert at least a portion of the working fluid away from the multi-effect distillation system and back to the intercooler, such that the portion of the working fluid flows in a bypass segment of the closed loop in and out of the intercooler, bypassing the multi-effect distillation system but remaining within the closed loop, until the working fluid reaches a desired temperature.

8. The system of claim 1, comprising a cooler disposed downstream of the multi-effect distillation system and upstream of the intercooler, wherein the cooler is configured to exchange heat between the working fluid exiting the multi-effect distillation system and a cooling agent.

9. The system of claim 8, comprising a blend valve configured to divert a first portion of the working fluid from entering the cooler, such that the first portion of the working fluid is combined with a second portion of the working fluid flowed through the cooler downstream of the cooler.

10. The system of claim 9, comprising a bypass valve disposed downstream of the intercooler, wherein the bypass valve is configured to divert the working fluid from entering the multi-effect distillation system, and the bypass valve is configured to flow the working fluid to the cooler.

11. The system of claim 1, comprising a feed heater configured to exchange heat between the working fluid exiting the multi-effect distillation system and the mixture prior to the mixture entering the first effect vessel of the multi-effect distillation system.

12. A system, comprising:
a controller configured to regulate at least one valve to control a flow of a working fluid through an intercooler of a compressor section of a gas turbine engine and through a multi-effect distillation system, wherein the flow of the working fluid is in a closed loop between the intercooler and the multi-effect distillation system, and wherein the working fluid comprises a maximum temperature of at most 220 degrees Fahrenheit and a minimum temperature of at least 180 degrees Fahrenheit as the working fluid enters a first effect vessel of the multi-effect distillation system.

13. The system of claim 12, comprising:
the at least one valve; and
the multi-effect distillation system;
wherein the at least one valve comprises a flow control valve disposed between the intercooler and the first vessel of the multi-effect distillation system.

14. The system of claim 13, wherein the at least one valve comprises a bypass valve disposed downstream of the intercooler, wherein the bypass valve is configured to divert the working fluid from entering the multi-effect distillation system, and the bypass valve is configured to flow the working fluid to a cooler disposed upstream of the intercooler.

15. The system of claim 13, wherein the at least one valve comprises a blend valve configured to divert a first portion of the working fluid from entering a cooler, such that the first portion of the working fluid is combined with a second portion of the working fluid flowed through the cooler downstream of the cooler.

16. The system of claim 13, wherein the at least one valve comprises a warm up valve configured to divert at least a portion of the working fluid away from the multi-effect distillation system and back to the intercooler, such that the portion of the working fluid bypasses the multi-effect distillation system until the working fluid reaches a desired temperature.

17. The system of claim 13, comprising at least one temperature sensor, wherein the at least one temperature sensor is configured to measure a temperature of the working fluid, a temperature of the compressed air, or both, wherein the controller is configured to regulate operation of one of the at least one valve based on feedback received from the at least one temperature sensor.

18. A method, comprising:
flowing a working fluid through an intercooler of a compressor section of a gas turbine engine;
exchanging heat between the working fluid and compressed air from the compressor section of the gas turbine engine;
flowing the working fluid along a first flow path from the intercooler to a multi-effect distillation system such that the working fluid comprises a maximum temperature of at most 220 degrees Fahrenheit and a minimum temperature of at least 180 degrees Fahrenheit as the working fluid enters a vessel of the multi-effect distillation system;
providing heat only from the working fluid to a mixture within the vessel of the multi-effect distillation system; and
flowing the working fluid along a second path from the multi-effect distillation system to the intercooler, wherein the first path and the second path are coupled together in a closed loop.

19. The system of claim 1, wherein the maximum temperature is at most 210 degrees Fahrenheit.

20. The system of claim 12, wherein the maximum temperature is at most 210 degrees Fahrenheit.

* * * * *